June 9, 1953 B. B. BAUER 2,641,475

PHONOGRAPH STYLUS

Filed Nov. 22, 1947 2 Sheets-Sheet 1

INVENTOR.
Benjamin B. Bauer
BY
Thiess, Olson & Mecklenburger.
Attys

PHONOGRAPH STYLUS

Filed Nov. 22, 1947 2 Sheets-Sheet 2

INVENTOR.
Benjamin B. Bauer
BY
Thiess, Olson & Mecklenburger.
Att'ys

Patented June 9, 1953

2,641,475

UNITED STATES PATENT OFFICE 2,641,475

PHONOGRAPH STYLUS

Benjamin B. Bauer, Oak Park, Ill., assignor to Shure Brothers, Incorporated, Chicago, Ill., a corporation of Illinois Application November 22, 1947, Serial No. 787,572

7 Claims. (Cl. 274—38)

This invention relates to styluses for reproducing sound records, more particularly to styluses including protective means and vibration damping means, and it is an object of the invention to provide an improved stylus of this character.

Quality of reproduction of a sound record by means of a stylus or needle engaging the record grooves is a function of numerous factors among which are the amount of surface noise radiated into the atmosphere directly from the stylus and associated parts, and the range of frequencies transmitted by the stylus to the pickup apparatus and phonograph. It has been suggested to reduce the amount of radiated surface noise by providing the stylus with a resilient record engaging portion, frequently taking the form of a member which is relatively resilient vertically and relatively rigid laterally or horizontally. With such constructions, surface irregularities tend to be absorbed and not transmitted to the listener. The stylus structure has some mass, which together with the resilience of the record engaging portion, may cause resonances to occur at frequencies still within the desired range and high frequencies may be incompletely transmitted if not eliminated altogether. Accordingly, it is a further object of the invention to provide improved means in a reproducing stylus for damping undesired vibrations and improving the transmission of high frequencies.

The vertical resilience of the stylus record engaging portion makes it desirable to provide some structure for preventing overstressing thereof. For example, when the phonograph tone arm with stylus attached is dropped on to the record, a force several times greater than that normally exerted is imposed. Such forces may injure the record engaging member. Accordingly, it is a further object of the invention to provide a reproducing stylus embodying improved means for protecting the record engaging point.

It is a further object of the invention to provide a reproducing stylus having a resiliently mounted record engaging member with improved means for preventing excessive stresses therein.

In record playing machines the turntable may carry as many as twelve or more records and may have any number between one and twelve records thereon at any time. This may cause the tone arm, and the stylus attached thereto, to lie at differing angles relative to the record. Accordingly, it is an object of the invention to provide in a stylus, for use with reproducers capable of reproducing any record in a stack thereof, means for preventing overstressing of the stylus without interfering with the transmission characteristics thereof irrespective of which record in the stack is being reproduced.

In carrying out the invention in one form, a stylus for reproducing sound records is provided comprising a shank, a vertically compliant record engaging member connected to the shank, protective means extending alongside the record engaging member, and compliant means connecting the record engaging member and the protective means.

For a more complete understanding of the invention, reference should be had to the accompanying drawings in which:

Fig. 5(*b*) is a view corresponding to Fig. 5(*a*) wherein the first record of a series is being reproduced;

Figures 5A, 5B, 6A, 6B, 7, 8, 9, 10:
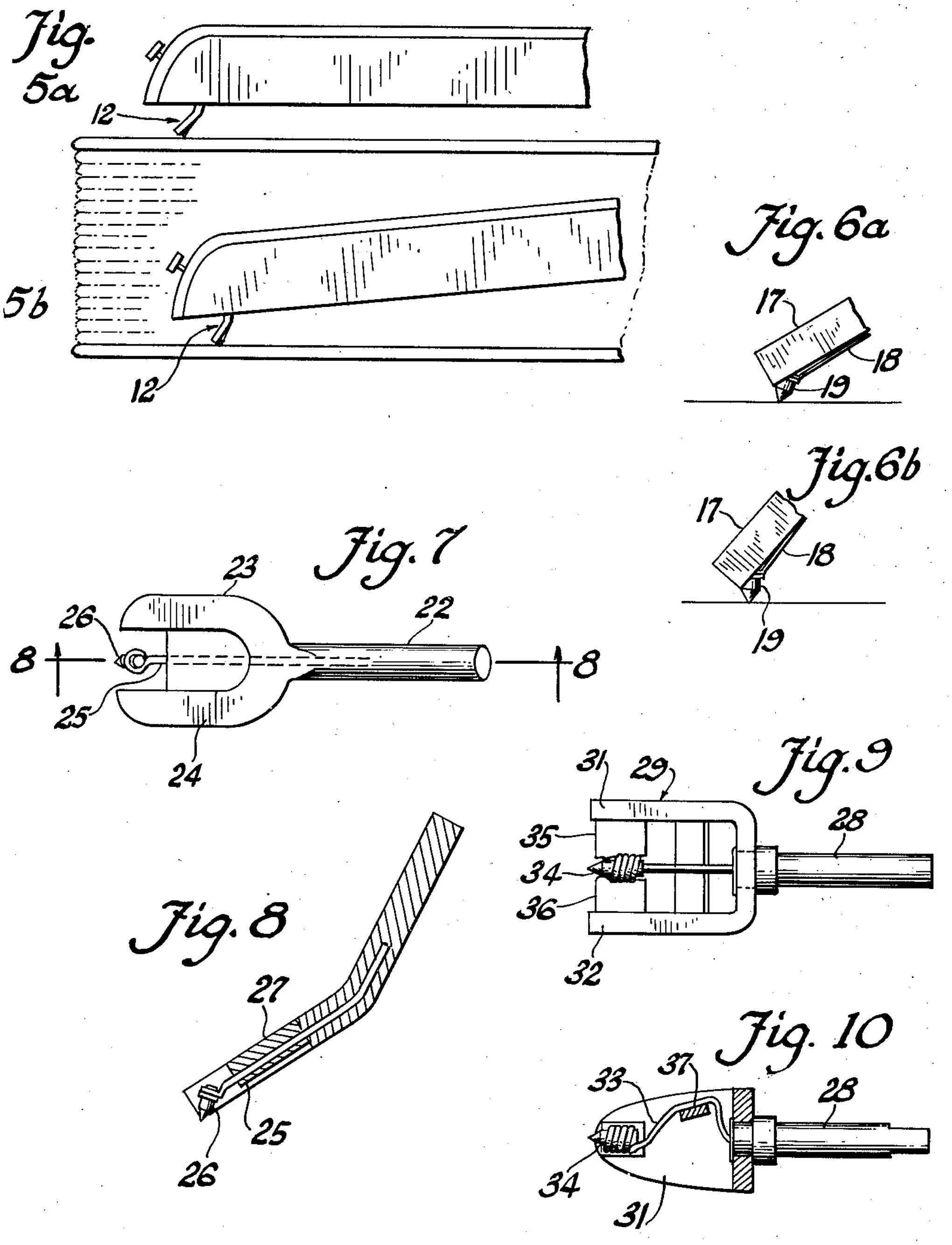
Fig. 5(*a*) is a side view similar to Fig. 1 showing apparatus reproducing the top one of a series of records.

Figs. 6(*a*) and 6(*b*) are fragmentary view on a larger scale of corresponding Figs. 5(*a*) and 5(*b*);

Figure 7 is a top view of a modified form of the invention;

Fig. 8 is a sectional view taken substantially along lines 8—8 of Fig. 7;

Fig. 9 is a top view of a modified form of the invention; and

Fig. 10 is a side view partially in section of Fig. 9.

Figure 1:
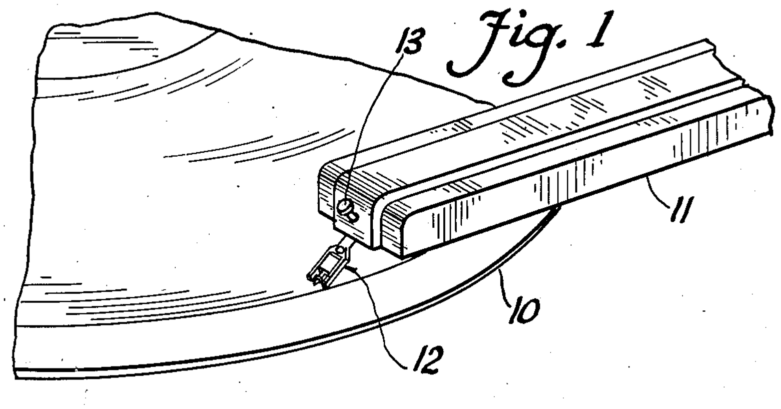
Figure 1 is a fragmentary view in perspective of reproducing apparatus embodying the invention.

Referring to the drawings, the stylus of the invention is embodied in a phonograph shown diagrammatically in Fig. 1 as comprising a record 10 and a phonograph tone arm 11, a stylus 12 being shown attached to the tone arm by a thumbscrew 13 in a manner which is well understood.

Figures 2, 3, 4:
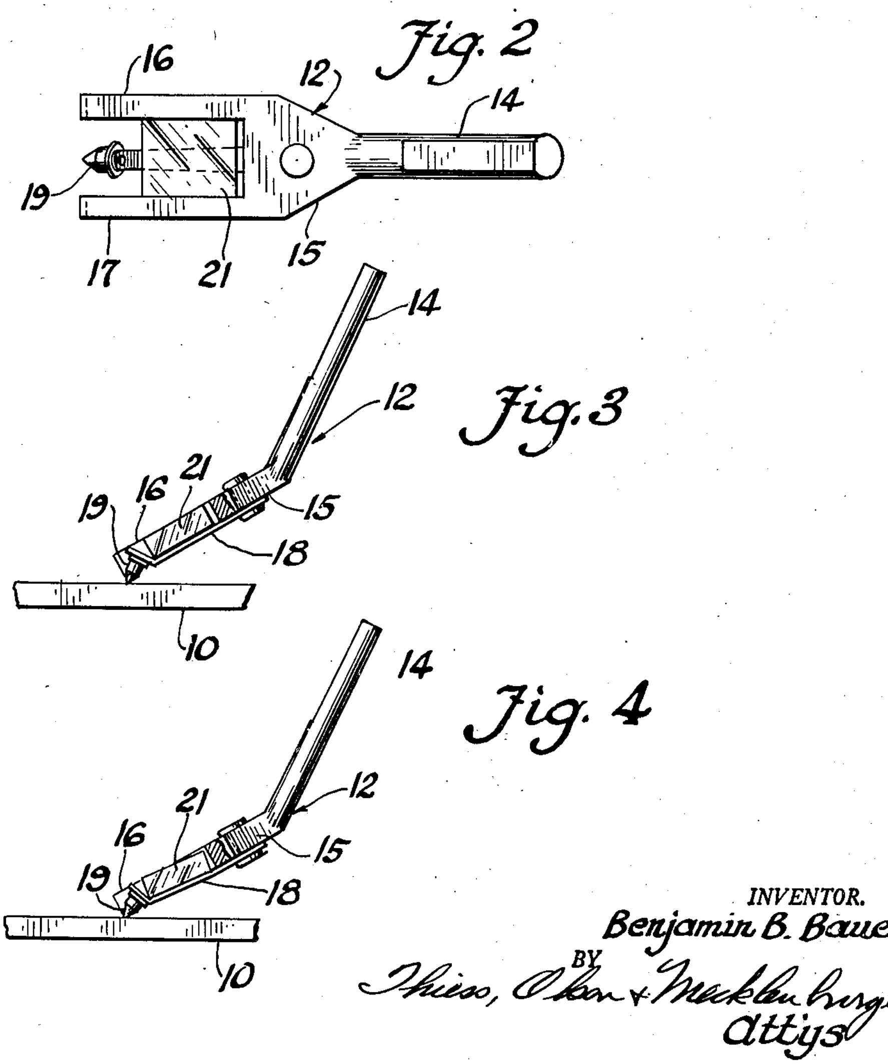
Fig. 2 is a top view of a record reproducing stylus embodying the invention.
Fig. 3 is a side view partially broken away of Fig. 2.
Fig. 4 is a view similar to Fig. 3 with the parts of the stylus in one position of operation.

Referring to Figs. 2, 3 and 4, the stylus 12 comprises a shank 14 extending upwardly from a central portion 15 from which extend two prongs 16 and 17. A vertically resilient or spring-like member 18 is attached at one end to central portion 15 by some suitable means, such for example as by riveting, the member 18 extending downwardly in the general direction of prongs 16 and 17, and at its lower end there is attached a record engaging pointer 19. Held between prongs 16 and 17 there is a block of material 21 which material is largely viscous in character although it has elasticity as well. Such substances are known as elastomers, one satisfactory form of which is Du Pont "Pyralin" type X-2450. The elastomer block 21 is firmly cemented to the inside surfaces of prongs 16 and 17 and to the upper surface of resilient member 18, as shown.

Resilient member 18 may be formed of any suitable material, such for example as steel, and is made sufficiently thin so that it will deflect under forces applied to it, but nevertheless is sufficiently stiff to support the phonograph tone arm without substantial deflection. Accordingly, the elastomer block 21 during normal operation of the stylus is not substantially deformed. Resilient member 18 is wider than it is thick in order that it may be relatively rigid laterally. In practical applications the width of member 18 may preferably be two or more times the thickness thereof. Inasmuch as member 18 is firmly attached to central portion 15, it will be apparent that pointer 19 and member 18 may deflect upwardly in between prongs 16 and 17 when vertical deflection of the pointer 19 occurs. Some vertical deflections occur due to irregularities in the record, the elastomer block 21 deforming upwardly in conformance therewith. By virtue of this deformation, no movement is transmitted to the shank 14 and thus no movement is transmitted to the pickup apparatus within the tone arm. However, when lateral movements of pointer 19 occur, such as by its following the record grooves, the movements are transmitted to shank 14 inasmuch as member 18 is laterally rigid and is firmly attached to central portion 15. During these movements the elastomer block 21 assists in the transmission thereof to prongs 16 and 17 and thus to shank 14. Being viscous as well as elastic in character, the vertical movements of resilient member 18 are followed by corresponding movements of elastomer block 21, particularly at low frequencies.

The frequency response of the stylus is such that all frequencies within the range capable of being recorded on a record are faithfully transmitted to the pickup apparatus. That is to say, the stylus introduces no distortions of its own and does not act to prevent the transmission of high frequencies. At low frequencies the lateral movements of pointer 19 and spring member 18 are relatively slow and the transmission thereof occurs largely by virtue of the rigid connection of member 18 to the central portion 15, inasmuch as the elastomer 21 is less stiff than spring 18. At higher frequencies the stiffness of spring member 18 and the mass of the stylus, including the prongs 16 and 17, tend to resonate with each other with resultant large amplitudes of movement and the consequent discrimination in favor of these over other frequencies. This is substantially prevented by the stylus of my invention because the elastomer 21 is viscous and therefore acts as a damping means. At frequencies above resonance, the rate of movement of pointer 19 and the spring 18 become higher and consequently relative movements between spring 18 and the stylus shank are resisted with a greater force by the elastomer block. Hence, the higher frequencies, instead of being dissipated, are transmitted to shank 14 and are reproduced by the apparatus. Thus the elastomer block 21 may assist somewhat with the transmission of low frequencies, prevents undesirable resonances, and very actively assists in the transmission of high frequencies. Accordingly, response over the usable frequency range is substantially improved and uniform.

The length of prongs 16 and 17 and the length of spring member 18 with the pointer 19 attached are such that the lower end of the prongs lie substantially directly above the end of pointer 19 when the stylus is in the operating position (Fig. 3). While in this figure prongs 16 and 17 have been shown at approximately 30° from the horizontal, and shank 14 has been shown at approximately 65° from the horizontal, it will be understood that these angles are representative of one form of the invention and may be varied throughout a substantial range without departing from the spirit and scope of the invention. When vertical forces are exerted on the tone arm and hence on the stylus, point 19 moves upwardly in between prongs 16 and 17 against its own resilience and against the resistance of elastomer block 21, the elastomer block resisting this movement by being placed in shear. Normal vertical movements of pointer 19 may take place inasmuch as the lower end thereof lies below the lower corner of prongs 16 and 17, but when large vertical forces are exerted downwardly on the stylus, the spring member 18 deflects upwardly sufficiently so that the lower corners of prongs 16 and 17 come into contact with the record 10 and thereby prevent movement of the pointer beyond this amount. The resilience of spring 18 and its material may be so chosen that deflections of this amount are not harmful. In Fig. 4 the pointer 19 is shown deflected the maximum amount since prongs 16 and 17 are in contact with record 10.

Referring to Figs. 5 and 6, there are shown two extreme positions of the stylus and tone arm which may be encountered during normal operation. In well known forms of record reproducers the series of records may be held above the turntable and as each record is to be played it is dropped down upon the turntable and the stylus moved to engage the record grooves. When the first record on the turntable is being played, the tone arm is tilted downwardly as shown in Fig. 5(*b*) inasmuch as the tone arm is pivotally fixed at one end and must be capable of moving over the record even when the last one of a series of records is being played, as shown in Fig. 5(*a*). The protective feature of the stylus, that is, protecting the pointer from injury due to excessive forces being exerted thereon, is operative in the positions shown in Figs. 5(*a*) and 5(*b*) as well as anywhere in between. With the lower corners of prongs 16 and 17 lying substantially above the point of the pointer, the stylus may deflect substantially the same amount at all playing positions. This may be best understood by referring to Figs. 6(*a*) and 6(*b*).

In Fig. 6(*a*) prongs 16 and 17 and pointer 19 occupy the position shown in Fig. 5(*a*) and the lower corners of the prongs are in a position to engage the record when excessive vertical movements occur. In Fig. 6(*b*) the prongs and the stylus members are shown corresponding to Fig. 5(*b*) when the tone arm is titled at an angle. This causes prongs 16 and 17 to be tilted at an angle greater than that shown in Fig. 6(*a*). However, the lower corners of prongs 16 and 17 being substantially vertically above point 19 in Fig.

6(*a*), these corners remain in substantially the same relative vertical position in Fig. 6(*b*). Increasing the length of prongs 16 and 17 beyond a certain amount would result in a case where normal vertical movements of the stylus may be obtained when the stylus is in the position of Fig. 6(*a*), but when it is in the position of Fig. 6(*b*) the lower ends of the prongs may be too close to the record and hence normal vertical movements of the stylus may be prevented.

The record engaging point 19 may be made of any suitable material, such for example as hardened steel or sapphire.

In Figs. 7 and 8 a modification of the stylus has been shown in which the record engaging pointer is attached in a different manner to the stylus shank. In this modification the stylus comprises a shank 22 from which projects a pair of prongs 23 and 24 at the lower end thereof. Lying between prongs 23 and 24 is a resilient rod-like member 25 which has a record engaging pointer 26 attached to one end thereof, the other end of the rod-like member being inserted into a suitably provided hole in shank 22 for firmly holding this member therein. Rod member 25 passes through a hole in an elastomer block 27, which block is held between prongs 23 and 24 and is firmly attached thereto by means such as cementing. The lower corners of prongs 23 and 24 are arranged to lie substantially vertically above the point of record engaging pointer 26. In this modification, also, normal vertical movements of the pointer may occur and excessive movements are prevented by the ends of prongs 23 and 24 coming into contact with the record. Lateral or horizontal movements of the stylus are transmitted to shank 22 by rod member 25 and by elastomer block 27.

Rod 25 is as resilient in a horizontal plane as it is in the vertical. However, low frequencies are transmitted faithfully inasmuch as the stiffness of the elastomer 27 being a substantial part of the total stiffness assists therein. High frequencies are transmitted with the assistance of the elastomer block 27 due to its viscosity, as described for the modification of Fig. 2, and likewise it serves to damp out undesired resonances.

In Fig. 9 I have shown a further modification in which the stylus comprises a shank 28 attached by riveting, or other suitable means, to a generally U-shaped member 29 having a pair of prongs 31 and 32. Supported between prongs 31 and 32 is a resilient rod-like member 33 bent into the configuration shown in Fig. 10 and having one end thereof firmly received in a suitable opening in shank 28. The other end of rod 33 may be attached to a record engaging point 34 in any suitable manner, for example such as by coiling the member 33 therearound.

The U-shaped configuration of member 33 imparts a greater vertical resilience thereto whereby pointer 34 may more easily deflect under vertical forces. It also makes member 33 and the attached pointer 34 more resilient in the horizontal plane. Accordingly, to facilitate the transmission of lateral vibrations, pieces 35 and 36 of elastomer are placed between prongs 31, 32 respectively and the forward end of member 33. Elastomer blocks 35 and 36 are cemented to the cooperating parts or are otherwise attached thereto.

To further assist in the transmission of lateral vibrations to shank 28, a piece of elastomer 37 is supported between prongs 31 and 32 and is cemented to the underside of member 33 at its upper portion. The elastomer members permit small vertical movements of pointer 34 into the space between prongs 31 and 32 for protective purposes, as has already been described. At low frequencies the stiffness of elastomer members 31, 32 and 37, in addition to the stiffness of member 33, transmits vibrations faithfully and, likewise, as has already been described, the elastomer elements, due to their viscosity, prevent resonances of the stylus and assist in the transmission of high frequencies.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. A stylus for reproducing sound records comprising, a forked shank, a compliant element held between the prongs thereof, and a vertically resilient record engaging member attached to the underside of said shank and to the underside of said compliant element, the end of said record engaging member being a point and lying substantially in a vertical plane with the ends of said prongs.

2. A stylus for reproducing sound records comprising, a shank, a vertically compliant arm connected to said shank and including a record engaging point at the end thereof, protective means directly attached to said shank and extending alongside said arm, said protective means having at least one end terminating laterally of said point and lying in a substantially vertical plane with said point, and compliant means having energy absorbing properties attached to said protective means, said compliant means having a hole therethrough through which extends said vertically compliant arm.

3. A stylus for reproducing sound records comprising, a shank, a pair of spaced prongs each including an end extending from said shank, a compliant element secured at opposite ends to said spaced prongs and extending substantially directly across the space between said prongs, a vertically resilient arm attached at one end to said shank and attached to said compliant element intermediate said prongs, and a record engaging point attached at the other end of said arm and protruding laterally from between the ends of said prongs, said ends of said prongs and the tip of said point lying substantially in the same plane perpendicular to a record in the normal playing position thereof.

4. A stylus for reproducing sound records comprising, a shank, a pair of spaced prongs each including an end extending from said shank, a compliant element secured at opposite ends to said spaced prongs and extending substantially directly across the space between said prongs, a vertically resilient and horizontally rigid arm attached at one end to said shank and attached to said compliant element intermediate said prongs, and a record engaging point attached at the other end of said arm and protruding laterally from between the ends of said prongs, said ends of said prongs and the tip of said point lying substantially in the same plane perpendicular to a record in the normal playing position thereof.

5. A stylus for reproducing sound records comprising, a shank, a pair of spaced prongs each including an end extending from said shank, a compliant element secured at opposite ends to said spaced prongs and extending substantially directly across the space between said prongs, a vertically resilient arm attached at one end to said shank, and a record engaging point attached at the other end of said arm and protruding laterally from between the ends of said prongs, said arm being attached to said compliant element intermediate said prongs whereby the portions of said compliant element lying at opposite sides of said arm will be placed alternately in compression and in tension by, and hence will strongly resist, transverse movement of said arm with respect to said prongs, and said compliant member will be placed in shear by, and hence will be relatively compliant to, perpendicular movement of said arm with respect to said prongs, said ends of said prongs and the tip of said point lying substantially in the same plane perpendicular to a record in the normal playing position thereof.

6. A stylus for reproducing sound records comprising, a shank, a pair of spaced prongs each including an end extending from said shank, a compliant element secured at opposite ends to said spaced prongs and extending substantially directly across the space between said prongs, a vertically resilient and horizontally rigid arm attached at one end to said shank and a record engaging point attached at the other end of said arm and protruding laterally from between the ends of said prongs, said arm being attached to said compliant element intermediate said prongs whereby the portions of said compliant element lying at opposite sides of said arm will be placed alternately in compression and in tension by, and hence will strongly resist, transverse movement of said arm with respect to said prongs, and said compliant member will be placed in shear by, and hence will be relatively compliant to, perpendicular movement of said arm with respect to said prongs, said ends of said prongs and the tip of said point lying substantially in the same plane perpendicular to a record in the normal playing position thereof.

7. A stylus for reproducing sound records comprising, a shank, a prong including an end extending from said shank, a vertically resilient arm attached at one end to said shank and laterally spaced with respect to said prong, a compliant element attached to said prong and to said arm thereby extending substantially directly across the space between said prong and said arm, and a record engaging point attached at the other end of said arm, the attachment of said compliant element to said arm and said prong effecting the placing of said compliant element alternately in compression and in tension by, and with consequent strong resistance to, transverse movement of said arm with respect to said prong, and effecting the placing of said compliant member in shear by, and with consequent relative compliance to, perpendicular movement of said arm with respect to said prong and said arm, the end of said prong and the tip of said point lying substantially in the same plane perpendicular to a record in the normal playing position thereof.

BENJAMIN B. BAUER.

References Cited in the file of this patent

UNITED STATES PATENTS

| Number | Name | Date |
|---|---|---|
| 1,260,365 | Gibson | Mar. 26, 1918 |
| 1,435,095 | Adams | Nov. 7, 1922 |
| 1,475,227 | Ferguson | Nov. 27, 1923 |
| 2,280,763 | Hasbrouck | Apr. 21, 1942 |
| 2,325,343 | Semple | July 27, 1943 |
| 2,326,389 | Pate | Aug. 10, 1943 |
| 2,399,035 | Imelmann | Apr. 23, 1946 |
| 2,399,585 | Thompson | Apr. 30, 1946 |
| 2,485,432 | Cornwell | Oct. 18, 1949 |
| 2,501,872 | Mencke | Mar. 28, 1950 |
| 2,534,735 | Roberts | Dec. 19, 1950 |